(12) United States Patent
Moller et al.

(10) Patent No.: US 9,007,307 B2
(45) Date of Patent: Apr. 14, 2015

(54) METHOD AND APPARATUS FOR ENHANCING KEYCAP LEGEND VISIBILITY IN LOW LIGHT CONDITIONS

(75) Inventors: Ronald Moller, Los Gatos, CA (US);
John T. Payne, San Jose, CA (US);
Liliya Lyandres, San Jose, CA (US);
Michael Nashner, San Jose, CA (US);
Kenichi Nakajima, Fujisawa (JP); Tsao Lun Chung, Taipei (TW)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 12/853,176

(22) Filed: Aug. 9, 2010

(65) Prior Publication Data

US 2012/0032888 A1 Feb. 9, 2012

(51) Int. Cl.
*G06F 3/02* (2006.01)
*G09G 5/00* (2006.01)
*G06F 1/16* (2006.01)

(52) U.S. Cl.
CPC ............ *G06F 1/1662* (2013.01); *G06F 3/0202* (2013.01)

(58) Field of Classification Search
USPC ................................................. 345/168–170
See application file for complete search history.

(56) References Cited

U.S. PATENT DOCUMENTS

| | | |
|---|---|---|
| 4,491,692 A | 1/1985 | Lee |
| 4,806,908 A | 2/1989 | Krupnik |
| 5,225,818 A * | 7/1993 | Lee et al. ...................... 345/170 |
| 5,234,744 A | 8/1993 | Kenmochi |
| 5,266,949 A | 11/1993 | Rossi |
| 5,510,782 A | 4/1996 | Norris et al. |
| 5,612,692 A | 3/1997 | Dugas et al. |
| 5,669,694 A | 9/1997 | Morton, Sr. |
| 5,684,513 A | 11/1997 | Decker |
| 5,708,428 A | 1/1998 | Phillips |
| 5,815,225 A | 9/1998 | Nelson |
| 6,036,326 A | 3/2000 | Yoshikawa et al. |
| 6,191,939 B1 | 2/2001 | Burnett et al. |
| 6,196,738 B1 | 3/2001 | Shimizu et al. |
| 6,262,884 B1 | 7/2001 | Hwang et al. |
| 6,608,271 B2 * | 8/2003 | Duarte ........................ 200/311 |
| 6,726,106 B1 | 4/2004 | Han et al. |

(Continued)

FOREIGN PATENT DOCUMENTS

DE 203 08 525 8/2003
EP 1 729 205 A2 12/2006

(Continued)

OTHER PUBLICATIONS

Anon, "Mirror Effect Ink Series", date unknown, 1 page.

(Continued)

*Primary Examiner* — Gerald Johnson

(57) ABSTRACT

Techniques and apparatus to provide improved visibility to user input devices, such as keys, are disclosed. In low light conditions, keys can be difficult to distinguish. For example, often keys have legends on them to visually distinguish them from one another, but in low light conditions it can be difficult for users to visually distinguish the different keys. The legends can be textual and/or graphic. Hence, according to one embodiment, light from a nearby display device can be used to provide illumination to the user input devices (e.g., keys). More particularly, in one embodiment, some light from the nearby display device can be directed towards and reflected from the user input devices (e.g., keys) to enhance visibility of the keys or the legends thereon.

21 Claims, 6 Drawing Sheets

(56) References Cited

U.S. PATENT DOCUMENTS

| | | |
|---|---|---|
| 6,771,333 B2 | 8/2004 | Tanaka et al. |
| 6,940,569 B2 | 9/2005 | Tanaka et al. |
| 6,987,466 B1 | 1/2006 | Welch et al. |
| 7,090,368 B2 | 8/2006 | Oross et al. |
| 7,236,154 B1 | 6/2007 | Kerr et al. |
| 7,293,890 B2 | 11/2007 | Chang et al. |
| 7,629,547 B2 | 12/2009 | Heath et al. |
| 7,683,279 B2 | 3/2010 | Kim |
| 8,684,579 B2 | 4/2014 | Chuang et al. |
| 2002/0050975 A1* | 5/2002 | Knox et al. .................. 345/102 |
| 2002/0063816 A1 | 5/2002 | Nakamura et al. |
| 2004/0067087 A1 | 4/2004 | Al-raheem et al. |
| 2004/0081503 A1 | 4/2004 | Al-raheem et al. |
| 2004/0227867 A1 | 11/2004 | Tanaka et al. |
| 2006/0042921 A1* | 3/2006 | Saitoh ........................ 200/302.2 |
| 2009/0128492 A1* | 5/2009 | Yoo et al. .................... 345/168 |
| 2009/0173610 A1 | 7/2009 | Bronstein et al. |
| 2009/0225028 A1 | 9/2009 | Abrams et al. |
| 2009/0242368 A1* | 10/2009 | Chang et al. .................. 200/310 |
| 2010/0026632 A1* | 2/2010 | Ishida et al. .................. 345/170 |
| 2010/0195276 A1* | 8/2010 | Yokoyama et al. ...... 361/679.27 |

FOREIGN PATENT DOCUMENTS

| | | |
|---|---|---|
| EP | 1 768 012 A2 | 3/2007 |
| EP | 2 031 616 A2 | 3/2009 |
| JP | H08-087009 | 4/1998 |
| JP | 2002-298681 | 10/2002 |
| JP | 2003-217381 | 7/2003 |
| JP | 2006-060334 | 3/2006 |
| KR | 10-1996-0001815 | 1/1996 |

OTHER PUBLICATIONS

Written Opinion for International Application No. PCT/US2011/046332, mailed Nov. 11, 2011.

International Search Report for International Application No. PCT/US2011/065421, mailed Nov. 11, 2011.

Office Action for Taiwanese Patent Application No. 100128249, mailed Oct. 23, 2013.

Office Action for Mexican Patent Application No. MX/a/2013/001616, mailed Oct. 24, 2013.

Office Action for Australian Patent Application No. 2011289747, mailed Dec. 5, 2013.

Notice of Preliminary Rejection for Korean patent Application No. 10-2013-7006059, mailed Jan. 10, 2014.

Office Action for Japanese Patent Application No. 2013-524104, mailed Feb. 3, 2014.

Office Action for Mexican Patent Application No. MX/a/2013/001616, mailed Mar. 13, 2014.

Office Action for Japanese Patent Application No. 2013-524104, mailed Aug. 4, 2014.

Examiner's Second Report for Australian Patent Application No. 2011289747, mailed Aug. 14, 2014.

Office Action for Taiwanese Patent Application No. 100128249, mailed May 27, 2014.

* cited by examiner

METHOD AND APPARATUS FOR ENHANCING KEYCAP LEGEND VISIBILITY IN LOW LIGHT CONDITIONS

BACKGROUND OF THE INVENTION

1. Field of the Invention

The present invention relates to illumination of keys for electronic devices and, more particularly, to illumination of keys for electronic devices using reflected light.

2. Description of the Related Art

Computing devices, such as notebook computers, mobile phones, netbook computers, e-readers and others, commonly provide one or more keys for user selection. The keys are often provided in a keyboard or keypad. In order for user to see and visually distinguish between the keys, the keys include legends. For example, a given key might be for the character "a", the number "1" or a symbol "#". Providing the legends in a color that has a high contrast to a base color of the keys can be helpful to visibility. In some cases, these computer systems can provide backlighting to the keys. The backlighting provides illumination to the keys so that a user can visually distinguish between the keys. Such illumination is particularly useful when the computing devices are used in low light conditions.

Unfortunately, however, providing backlighting requires additional circuitry and optical components. Backlighting when active also consumes power and thus renders the computing device less power efficient. Accordingly, there is a continuing need to provide alternative ways to provide illumination of keys for low light conditions.

SUMMARY

The invention pertains to techniques and apparatus to provide improved visibility to user input devices, such as keys. In low light conditions, keys can be difficult to distinguish. For example, often keys have legends on them to visually distinguish them from one another, but in low light conditions it can be difficult for users to visually distinguish the different keys. The legends can be textual and/or graphic. Hence, according to one embodiment, light from a nearby display device can be used to provide illumination to the user input devices (e.g., keys). More particularly, in one embodiment, some light from the nearby display device can be directed towards and reflected from the user input devices (e.g., keys) to enhance visibility of the keys or the legends thereon. As discussed below, the user input devices (e.g., key) can be configured to enhance reflection of light and thereby improve visibility of the keys or the legends thereon.

The invention can be implemented in numerous ways, including as a method, system, device, or apparatus. Several embodiments of the invention are discussed below.

According to one embodiment, a computing device can include a display for presenting displayed data, and at least one key configured to facilitate user input to the computing device. The at least one key includes a key structure, a reflective layer disposed adjacent the key structure, and a diffusion layer disposed over the reflective layer.

According to another embodiment, a method for illuminating keys of a portable computing device can use light from a display associated with the portable computing device. More particularly, the method can include receiving, at the keys, at least a portion of light emitted from the display and directed toward the keys; reflecting a portion of the light emitted from the display and directed toward the keys; diffusing the reflected portion of the light; and providing the diffused, reflected light to a user position.

According to still another embodiment, a non-backlit key of an electronic device can include a top surface, a reflective layer disposed proximate the top surface and representing a legend, and a diffusion layer disposed over the reflective layer. The diffusion layer operates to diffuse light reflected from the reflective layer in a controlled manner such that the legend of the non-backlit key is more visible in low light conditions.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to techniques and apparatus to provide improved visibility to user input devices, such as keys. In low light conditions, keys can be difficult to distinguish. For example, often keys have legends on them to visually distinguish them from one another, but in low light conditions it can be difficult for users to visually distinguish the different keys. The legends can be textual and/or graphic. Hence, according to one embodiment, light from a nearby display device can be used to provide illumination to the user input devices (e.g., keys). More particularly, in one embodiment, some light from the nearby display device can be directed towards and reflected from the user input devices (e.g., keys) to enhance visibility of the keys or the legends thereon. As discussed below, the user input devices (e.g., key) can be configured to enhance reflection of light and thereby improve visibility of the keys or the legends thereon.

Embodiments of the invention are discussed below with reference to FIGS. 1-5D. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

Figure 1:
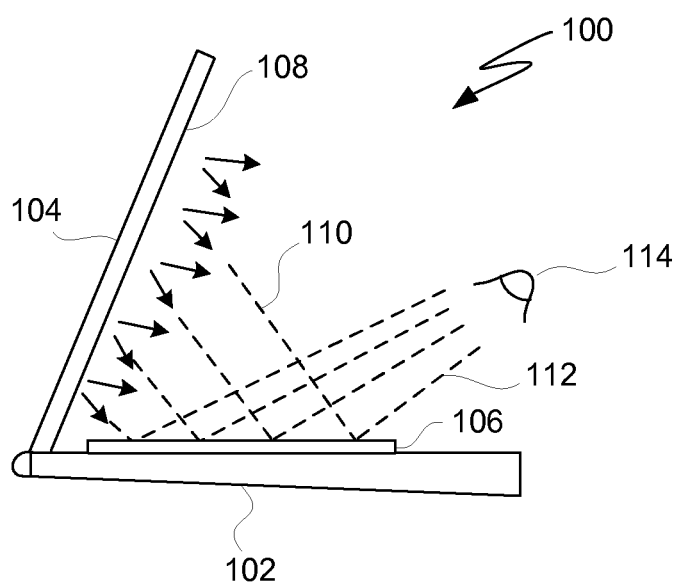
FIG. 1 is a side view of a computing device according to one embodiment.

FIG. 1 is a side view of an electronic device 100 according to one embodiment. The electronic device 100 is, for example, a mobile computing device (e.g., a laptop computer, a notebook computer or a netbook computer), a mobile communication device (e.g., a mobile phone) or a digital media playback device (e.g., a DVD player). The electronic device 100 includes a base portion 102 and a top portion 104. The base portion 102 houses at least one printed circuit board together with various electrical components that interoperate to provide an electronic device (e.g., computing device) for either general purposes or specific purposes. The base portion 102 also supports a user input region 106. For example, the user input region 106 can include a keyboard or keypad having a plurality of keys. The top portion 104 can contain a display device 108. When operating, the display device 108 produces light for illumination of text or graphics being presented on the display device 108. While most of the light from the display device 108 is typically emitted normal to the surface of the display device 108, a portion of the light can also be directed towards the base portion 102. The portion of the light that from the display device 108 that is directed towards the base portion 102 can be reflected from one or more of the keys (e.g., key tops or key caps) of the user input region 106 (e.g., keyboard). The reflected light 112 can be directed towards the eyes 114 of a user on the computing device 100. Consequently, the reflected light 112 facilitates the user in recognizing legends provided on the keys in the user input region 106 (e.g., keyboard) in low light conditions.

Figure 2A:
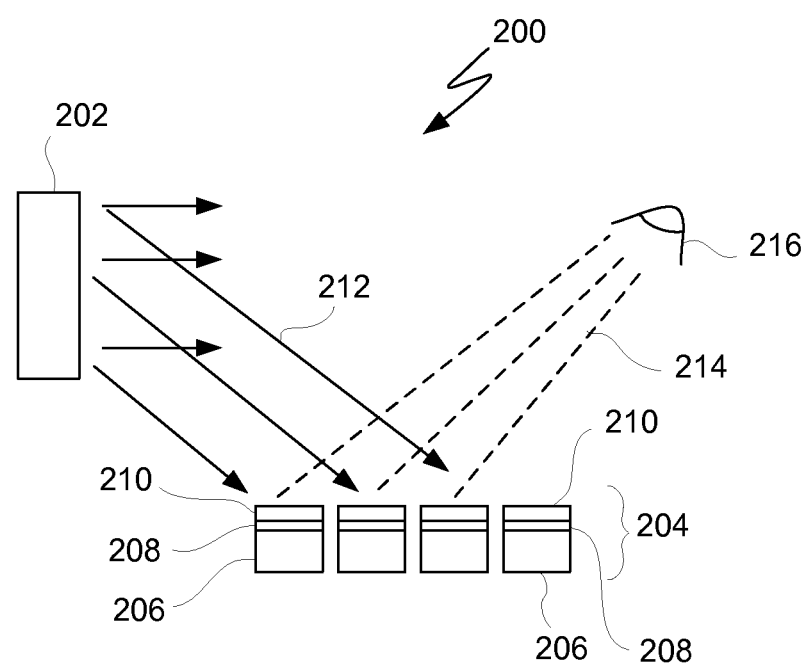
FIG. 2A is a conceptual diagram of an optical arrangement illustrating one embodiment.

FIG. 2A is a conceptual diagram of an optical arrangement 200 illustrating one embodiment. The optical arrangement 200 can, for example, be used with an electronic device. The optical arrangement 200 includes a light source 202. The light source 202 produces light that can be utilized to illuminate not only a display device but also keys within a key region 204. The light source 202 is, for example, provided by a backlight of a LCD display screen. The key region 204 includes a plurality of keys that can be similarly constructed so as to facilitate illumination in low light conditions. In particular, the keys within the key region 204 include key caps 206. A key cap is considered to be an upper portion or top of a key.

A key cap 206 can be modified to facilitate illumination. In particular, according to one embodiment, applied to the top of each of the key caps 206 is a reflective layer 208 and a diffusion layer 210. The reflective layer 208 can operate to reflect at least a portion of the light 212 from the light source 202 that is incident on the key region 204. The incident light 212 impinges on the keys caps 206 in the key region 204, and passes through the diffusion layer 210 and is then partially reflected by the reflective layer 208 to provide reflected light 214 directed towards the eyes 216 of a user.

The diffusion layer 210 operates to diffuse (or scatter) the reflected light 214 so that the illumination on the key caps 206 is diffused so that any images depicted by the light source 202 are diffused and thus the illumination of the key caps 206 provides general illumination as opposed to a direct reflection of images being depicted by the light source 202. For example, if the light source 202 were part of a display device, and if the display device were to present an image of a mountain on its display with illumination from the light source 202, then the diffusion layer 210 would diffuse the reflected light 214 so that the mountain would not be recognizable from the reflected light 214 being viewed by the user.

Figure 2B:
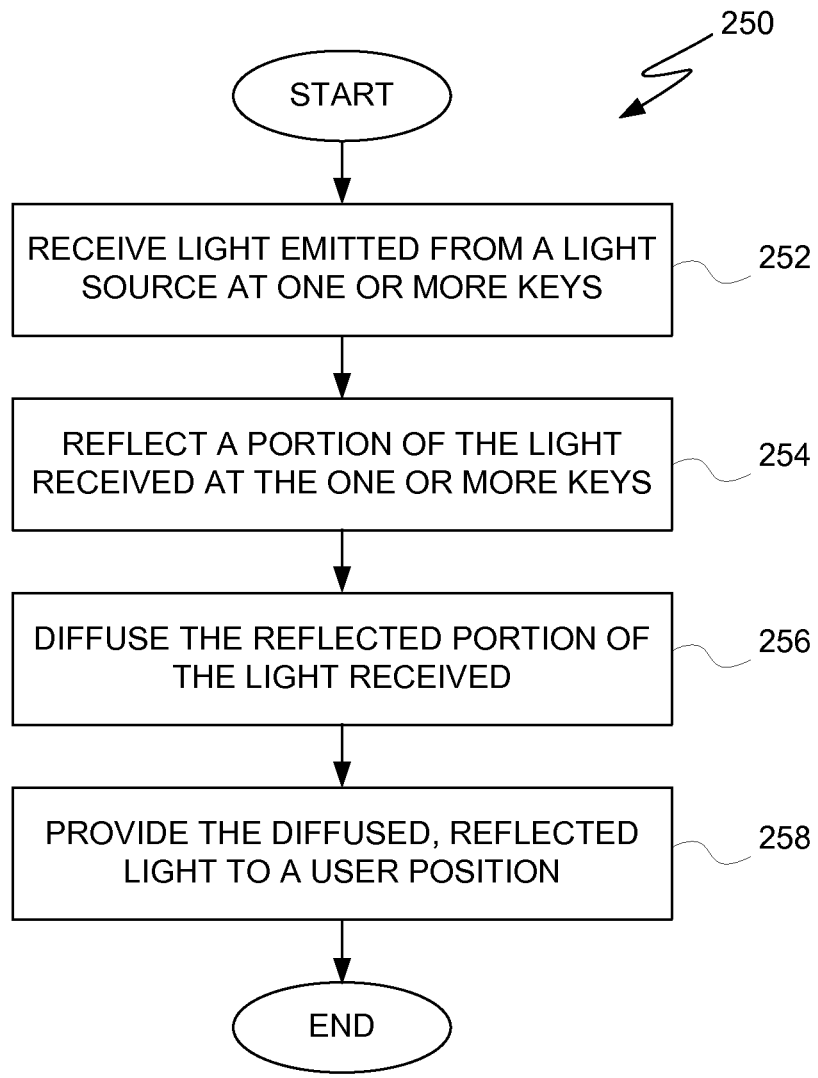
FIG. 2B is a flow diagram of a key illumination process according to one embodiment.

FIG. 2B is a flow diagram of a key illumination process 250 according to one embodiment. The key illumination process 250 is, for example, performed by an electronic device (e.g., computing device) having a light source and a key region with one or more keys. For example, the key illumination process 250 can be performed by the electronic device providing the optical arrangement 200 illustrated in FIG. 2A.

The key illumination process 250 can receive 252 light emitted from a light source (e.g., display) at one or more keys. A portion of the light received at the one or more keys can be reflected 254. The reflected portion of the light received at the one or more keys can then be diffused 256. Thereafter, the diffused, reflected light can be provided 258 to a user position. As a result, the one or more keys are able to be illuminated using light originating from a light source. The light source can be a display device of a portable computer. As such, the key illumination process 250 makes uses of an existing light source (e.g., display device) and thus does not require a dedicated light source. The reflection of the light from the one or more keys is due to reflective material provided on the one or more keys. In one implementation, the one or more keys can have key caps as described above with reference to FIG. 2A. Various suitable structures or arrangements for keys or key caps are detailed below.

Figure 3:
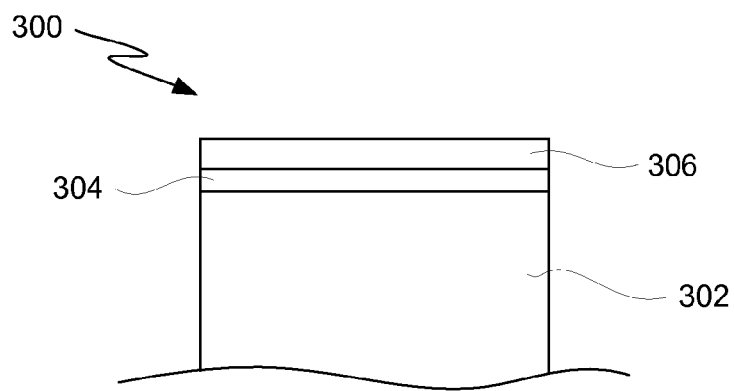
FIG. 3 is a side view of a reflective key according to one embodiment.

FIG. 3 is a side view of a reflective key 300 according to one embodiment. In this embodiment, the reflective key 300 can include a key structure 302, a reflective layer 304 provided on the top surface of the key structure 302, and a diffusion layer 306 provided over the reflective layer 304. For durability, it is advantageous to keep the reflective layer 304 and the diffusion layer 306 relatively thin. The thickness of the reflective layer 304 depends upon implementation. However, in one example, the reflective layer 304 can have a thickness of about 1-15 micrometers. The thickness of the diffusion layer 306 also depends upon implementation. However, in one example, the diffusion layer 306 can have a thickness of about 8-30 micrometers. The reflective layer 304 illustrated in FIG. 3 can be patterned directly or indirectly so that an appropriate legend is provided on the key structure 302.

The reflective layer 304 and the diffusion layer 306 can be provided in various different ways. In one embodiment, either or both of the reflective layer 304 and the diffusion layer 306 can be applied by being sprayed on. The sprayed on solution for the reflective layer 304 can be ink or paint based and include reflective material, such as small pieces of aluminum, silver or compounds (or alloys) thereof. The sprayed on solution for the diffusion layer 306 can also be ink or paint based. In another embodiment, the reflective layer can be applied by a silkscreen process. The diffusion layer 306 can be provided by a variety of materials. One suitable material for the diffusion layer 306 is acrylic paint.

Figure 4A:
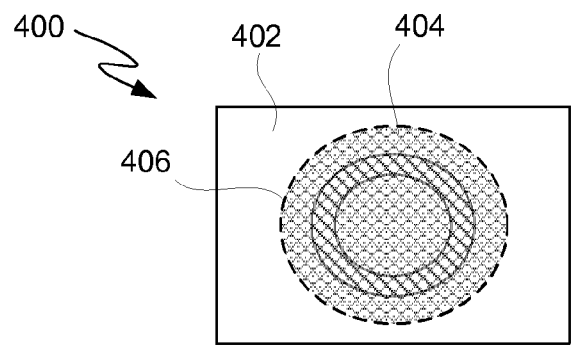
FIGS. 4A and 4B illustrate exemplary top surfaces of key caps according to different embodiments.
Figure 4B:
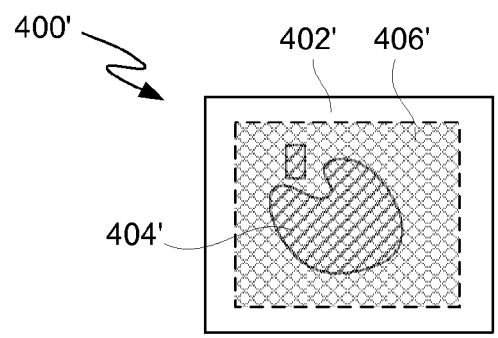

FIGS. 4A and 4B illustrate exemplary top surfaces of key caps according to different embodiments. In FIG. 4A, a key cap 400 includes a top surface 402. The top surface 402 of the key cap 400 illustrates a reflective legend 404. The reflective legend 404 is formed from a reflective material, such as the reflective layer 304 illustrated in FIG. 3. In the example shown in FIG. 4A, the reflective legend 404 shown in FIG. 4A has an "O" shape. A diffusion layer 406 can be provided on the top surface 402 over the reflective legend 404. The diffusion layer 406 typically covers at least the reflective legend 404 but also may cover the entire top surface 402 of the key cap 400.

In FIG. 4B, a key cap 400' is similar to the key cap 400 of FIG. 4A. Nevertheless, the key cap 400' includes a top surface 402'. The top surface 402' of the key cap 400' illustrates a reflective legend 404'. The reflective legend 404' is formed from a reflective material, such as the reflective layer 304 illustrated in FIG. 3. In the example shown in FIG. 4B, the reflective legend 404' shown in FIG. 4B can provide a graphical element, such as a corporate logo. A diffusion layer 406' can be provided on the top surface 402' over the reflective legend 404'. The diffusion layer 406' typically covers at least the reflective legend 404' but also may cover the entire top surface 402' of the key cap 400'.

Figure 5A:
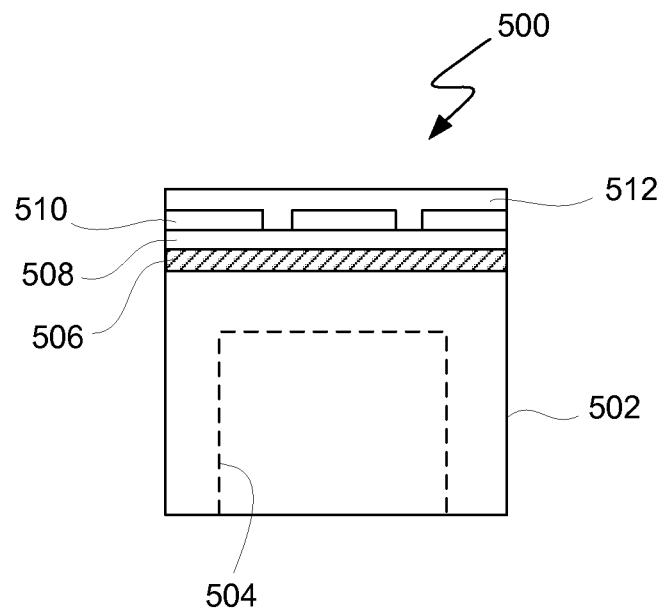
FIG. 5A is a cross-sectional view of a reflective key according to one embodiment.

FIG. 5A is a cross-sectional view of a reflective key 500 according to one embodiment. The reflective key 500 includes a key 502. In one embodiment, the key 502 can be opaque, such as a particular color (e.g., black). The key 502 can also includes an inner opening (or hollow portion) 504. The reflective key 500 can include a mirror layer 506 that is provided for a top surface of the key 502. The mirror layer 506 is provided by a reflective material. The reflective material can be a broad spectrum reflective material. For example, the mirror layer 506 can be formed of aluminum, silver or compounds (or alloys) thereof. In particular, the mirror layer 506 can be an ink or paint having aluminum or silver fragments therein. One suitable ink is a mirror effect ink from Seiko Advance Ltd. Of Tokyo, Japan. One suitable paint is a mirror effect paint from PPG Industries, Inc. of Pittsburgh, Pa. In addition, a barrier layer 508 can be provided over the mirror layer 506. The barrier layer 508 is at least partially if not fully translucent. The barrier 508 can be clear in color and may also include glass particles other clear materials (e.g., acrylic particles) to provide diffusion. The glass particles can, for example, be fibers or spheres. The thickness of the mirror layer 506 and the barrier layer 508 depend upon implementation. However, in one example, the mirror layer 506 and the barrier layer 508 can each have a thickness of about 9-12 and 8-11 micrometers, respectively.

Additionally, a patterned layer 510 can be provided over the barrier layer 508. The patterned layer 510 is typically an opaque layer, for example, black. The patterned layer 510 can be provided so as to cover at least a portion of the key 502 so that only select portions of the mirror layer 506 remain visible. Those portions of the mirror layer 506 not covered by the patterned layer 510 yield the desired legend for the key 502. The thickness of the patterned layer 510 also depends upon implementation. However, in one example, the patterned layer 510 can have a thickness of about 8-15 micrometers, or in a more particular example 9-11 micrometers.

After the patterned layer 510 has been applied, a protective layer 512 can be provided over the patterned layer 510. The protective layer 512 can protect the reflective legend that results from the reflective layer 506, the diffusion layer 508 and the patterned layer 510. The protective layer 512 is a thin protective coating. The thickness of the protective layer 512 depends upon implementation. However, in one example, the protective layer 512 can have a thickness of about 15-30 micrometers, or in a more particular example 20-22 micrometers. The protective layer 512 can also provide diffusion, in which case it can include diffusing materials. The protective layer 512 can be applied by being sprayed on. The sprayed on solution for the protective layer 512 can be ink or paint based and is typically clear (e.g., clear acrylic paint, clear resin) and may also include the diffusing materials. The gloss level (or diffusion effect) of the protective layer 512 can be controlled to limit gloss level (e.g., to about 5 gloss units).

The patterned layer 510 has a pattern that it is formed when the patterned layer 510 is initially applied, or formed into a layer that is initially applied. In one implementation, a layer is patterned when formed. For example, the layer can be sprayed, silk-screened or deposited (e.g., PVD) on in the desired pattern. In another implementation, the layer can be formed and then be patterned. For example, chemical etching or laser ablation can be used to pattern the layer.

Figure 5B:
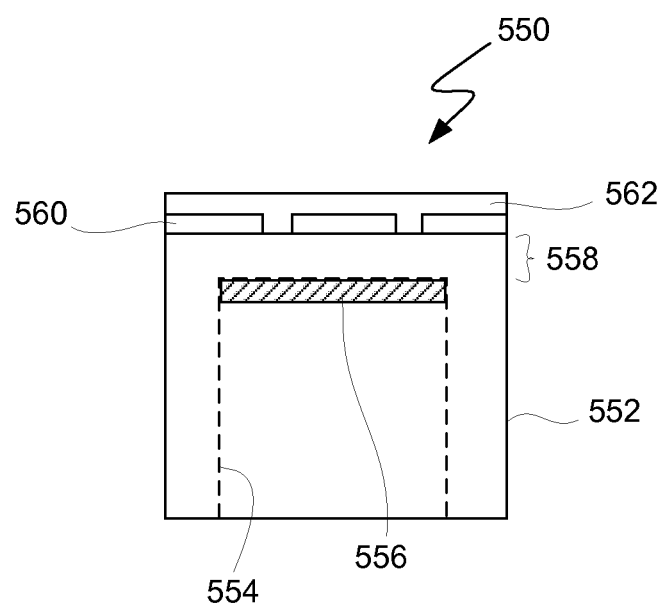
FIG. 5B is a cross-sectional view of a reflective key according to another embodiment.

FIG. 5B is a cross-sectional view of a reflective key 550 according to another embodiment. The reflective key 550 includes a key 552. In one embodiment, the key 552 can be at least partially translucent, such as clear. The key 552 can also include an inner opening (or hollow portion) 554.

In this embodiment, a mirror layer 556 can be provided on the inner, underside portion of the key 552. Hence, even though the mirror layer 556 is provided on the inner, underside portion of the inner opening 554, impinging light received via the top of the reflective key 550 can be reflected from the mirror layer 556. The mirror layer 556 can be provided by a reflective material. For example, mirror layer 556 can be formed on an ink or paint having quantities of aluminum or silver contained therein.

The reflective key 550 can also include a diffusion region 558. In this embodiment, the diffusion region 558 can be embedded within or provided by the material of the reflective key 550. At the top of the key 552, a patterned layer 560 can be provided to superimpose a pattern for a legend to be provided on the reflective key 550.

The patterned layer 560 is typically an opaque layer, for example, black. The patterned layer 560 can be provided so as to cover at least a portion of the key 552 so that only select portions of the mirror layer 556 remain visible. Those portions of the mirror layer 556 not covered by the patterned layer 560 yield the desired legend for the key 552.

After the patterned layer 560 has been applied, a protective layer 562 can be provided over the patterned layer 560. The protective layer 562 protects the reflective legend that results from the reflective layer 556, the diffusion region 558 and the patterned layer 560. The protective layer 512 is a thin protective coating. The thickness of the protective layer 512 depends upon implementation. However, in one example, the protective layer 512 can have a thickness of about 10-30 micrometers. The protective layer 512 can be applied by being sprayed on. The sprayed on solution for the protective layer 512 can be ink or paint based and is typically clear (e.g., clear acrylic paint, clear resin).

Figure 5C:
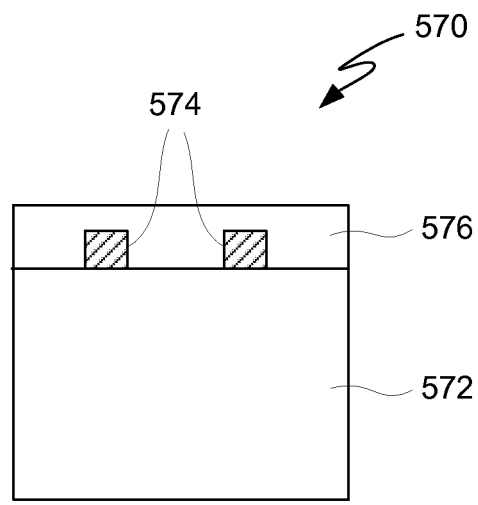
FIG. 5C is a cross-sectional view of a reflective key according to another embodiment.

FIG. 5C is a cross-sectional view of a reflective key 570 according to another embodiment. The reflective key 570 includes a key 572. In one embodiment, the key 572 can be opaque, such as a particular color (e.g., black). The key 572 can also include mirror elements 574. More generally, the mirror elements 574 can be referred to as reflective elements. The mirror elements 574 can be formed by patterning a mirror layer or by selectively forming the mirror elements 574. The patterning can make use of chemically etching or laser etching/ablation.

In addition, a protective layer 576 can be provided over the mirror elements 574 and other portion of the top of the key 572. In this embodiment, the protective layer 576 also serves as a diffusion layer. Diffusion can be provided by limiting the gloss characteristics of the protective layer 576. In this embodiment, the protective layer 576 is at least partially if not fully translucent. The protective layer 578 can be clear in color and may also include glass fibers to provide additional diffusion. The protective layer 576 can protect the reflective legend that results from the mirror elements 574 and the key 572.

Figure 5D:
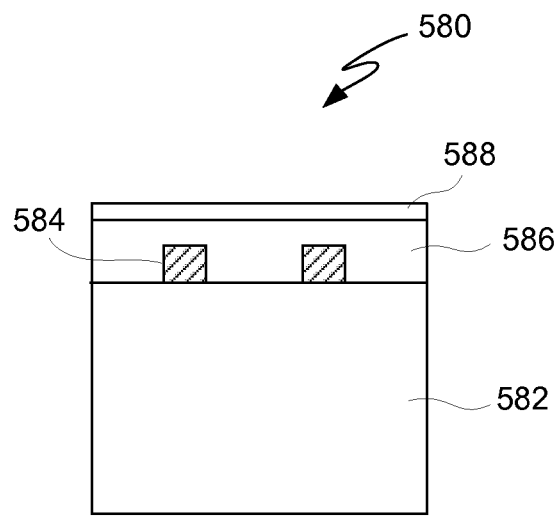
FIG. 5D is a cross-sectional view of a reflective key according to still another embodiment.

FIG. 5D is a cross-sectional view of a reflective key 580 according to still another embodiment. The reflective key 580 includes a key 582. In one embodiment, the key 582 can be opaque, such as a particular color (e.g., black). The key 582 can also include mirror elements 584. More generally, the mirror elements 584 can be referred to as reflective elements. For example, the mirror elements 584 can be formed of aluminum or silver. In particular, the mirror layer 506 can be an ink or paint having aluminum or silver fragments therein. The mirror elements 584 can be formed by patterning a mirror layer or by selectively forming the mirror elements 584. The patterning can make use of chemically etching or laser etching/ablation.

In addition, the reflective key 580 can provide a diffusion layer 586 over the mirror elements 584. The diffusion layer 586 can be at least partially if not fully translucent. The diffusion layer 586 can be clear in color and may also include glass fibers to provide additional diffusion. Additionally, a protective layer 588 can be provided over the diffusion layer 586. The protective layer 588 can protect the reflective legend that results from the mirror elements 584, the diffusion layer 586 and the key 582. It should be understood that the diffusion layer 586 and the protective layer 588 can be provided as separately deposited layers or a single layer providing both diffusion and protection.

The reflective layer or mirror elements discussed herein can be applied as ink or paint as noted above. Alternatively, the reflective layer or mirror elements can be applied by Physical Vapor Deposition (PVD) if formed of metal, such as silver or aluminum. In such case the thickness of the reflective layer or mirror elements can be as thin as one (1) micrometer or less.

Although the techniques described above primarily concern reflective legends for user input device, such as keys, in other embodiments, the techniques described herein can be use to provide other reflective markings that would advantageously be more visible in low light conditions. In general, the reflective markings, or annotations, provided on products can be textual and/or graphic. The marking can be provided for informational, cosmetic and/or functional reasons. For example, the markings can be used to provide a product (e.g., a product's housing) with certain information. The marking can, for example, be use to label the product with various information. When a marking includes text, the text can provide information concerning the product (e.g., electronic device). For example, the text can include one or more of: name of product, trademark or copyright information, design location, assembly location, model number, serial number, license number, agency approvals, standards compliance, electronic codes, memory of device, and the like. When a marking includes a graphic, the graphic can pertain to a logo, a certification mark, standards mark or an approval mark that is often associated with the product. The marking can be used for advertisements to be provided on products. The markings can also be used for customization (e.g., user customization) of a housing of a product.

Although the embodiments described herein do not require changes to a display device or keys, in some embodiment, it may be useful to alter the physical configuration of the display device or keys. For example, the display device could be altered such that a portion of its emitted light is incident on the keys to be illuminated. Also, for example, the keys could be altered to allow them to more efficiently receive the light emitted from the display device. For instance, the structure for the key could angled toward the display device.

The various aspects, features, embodiments or implementations of the invention described above can be used alone or in various combinations.

Different aspects, embodiments or implementations may, but need not, yield one or more of the following advantages. One advantage is that legends or marking can be made reflective with appropriate diffusion so that the legends or markings can be visible in low light conditions. Another advantage is that backlight is not need needed for keys (e.g., key boards or keypads) if the legends on the keys are made suitably reflective. Here, additional components to support backlighting are not needed and thus electronic device can potentially be made thinner. Still another advantage is that keys can be provided with reflective legends in a manner that renders the legends durable, protected and with reliable adhesion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing device, comprising:
 a display having a front surface for presenting displayed data; and
 at least one key configured to facilitate user input to the computing device, the at least one key including a key structure, a reflective layer disposed over a top surface of the key structure, and a diffusion layer disposed over the reflective layer,
 wherein the reflective layer of the at least one key is configured to reflect light emitted from the front surface of the display so that a user of the computing device is better able to see the reflective layer in low light environments.

2. A computing device as recited in claim 1, wherein the reflective layer is selectively patterned or covered to yield a reflective legend on the at least one key.

3. A computing device as recited in claim 1, wherein the diffusion layer provides diffusion for reflections from the reflective legend on the at least one key.

4. A computing device as recited in claim 3, wherein the reflective layer is selectively patterned or covered to yield a reflective legend on the at least one key, and wherein the computing device is a portable computing device.

5. A computing device as recited in claim 1, wherein the at least one key is part of a keypad.

6. A computing device as recited in claim 1, wherein the computing device is a portable computing device.

7. A computing device as recited in claim 1, wherein the reflective layer comprises aluminum, silver or compounds thereof.

8. A computing device as recited in claim 1, wherein the at least one key further including an outer protective layer.

9. A computing device as recited in claim 1, wherein the at least one key further including a patterned layer disposed over the diffusion layer, the patterned layer covers portions of the reflective layer, and wherein those portions of the reflective layer not being covered by the patterned layer form a legend on the at least one key.

10. A computing device as recited in claim 1, wherein the reflective layer is disposed directly on the top surface of the key structure, and wherein the reflective layer operates to reflect light directly incident from the front surface of the display to the top surface of the key structure.

11. A computing device as recited in claim 1, wherein the reflective layer is disposed on an upper inner surface of the key structure, and wherein at least a portion of an upper outer surface of the key structure is translucent.

12. A computing device as recited in claim 1, wherein the reflective layer comprises an ink including reflective material.

13. A computing device as recited in claim 1, wherein the reflective layer comprises a paint including reflective material.

14. A method for illuminating keys of a portable computing device using light from a display associated with the portable computing device, the method comprising:

receiving, at the keys, at least a portion of light emitted from a front surface of the display and directed toward the keys, the front surface of the display being for presenting displayed data;

reflecting a portion of the light emitted from the front surface of the display and directed toward the keys;

diffusing the reflected portion of the light;

providing the diffused, reflected light to a user position, wherein each of the keys include a reflective member to provide the reflecting, wherein each of the keys include a diffusion member to provide the diffusing, wherein the reflective member is provided on a top surface of the corresponding one of the keys, and wherein the diffusion member is provided on the top surface over the reflective member.

15. A method as recited in claim 14, wherein the keys pertain to key within a keypad.

16. A method as recited in claim 14, wherein the method comprises:

configuring each of the plurality of keys to reflect a portion of the light emitted from the display and directed towards the keys.

17. A method as recited in claim 14, wherein the light emitted from the display is provided by a backlight.

18. A method as recited in claim 14, wherein the reflective member comprises aluminum, silver or compounds thereof.

19. A method as recited in claim 14, wherein the reflective layer is disposed on an upper inner surface of each of the keys, and wherein at least a portion of an upper outer surface of the keys is translucent.

20. A non-backlit key of an electronic device, comprising:

a top surface;

a reflective layer disposed proximate the top surface and representing a legend; and a diffusion layer disposed over the reflective layer, the diffusion layer operational to diffuse light reflected from the reflective layer in a controlled manner such that the legend of the non-backlit key is more visible in low light conditions, wherein the electronic device is a portable computer having a base portion and a top portion, the top portion including a display having a front surface for presenting displayed data, and wherein the display, when operable, produces light and a portion of the produced light impinges on and is reflected by the reflective layer and then diffused by the diffusion layer.

21. A non-backlit key as recited in claim 20, wherein the reflective layer comprises an ink including reflective material.

* * * * *